United States Patent [19]

Shimada et al.

[11] Patent Number: 5,033,421
[45] Date of Patent: Jul. 23, 1991

[54] V TYPE ENGINE

[75] Inventors: Kazuo Shimada; Tatsuo Niiyama; Minoru Yonezawa, all of Iwata, Japan

[73] Assignee: Yamaha Hatsudoki Kabushiki Kaisha, Iwata, Japan

[21] Appl. No.: 479,984

[22] Filed: Feb. 14, 1990

[30] Foreign Application Priority Data

Feb. 15, 1989 [JP] Japan .................................. 1-33824

[51] Int. Cl.⁵ ............................................. F01L 1/04
[52] U.S. Cl. ............................. 123/90.27; 123/90.31
[58] Field of Search ......................... 123/90.27, 90.31

[56] References Cited

U.S. PATENT DOCUMENTS

| | | | |
|---|---|---|---|
| 4,553,473 | 11/1985 | Ichida et al. | 123/90.27 |
| 4,553,509 | 11/1985 | Mezger et al. | 123/90.27 |
| 4,643,143 | 2/1987 | Uchiyama et al. | 123/90.27 |
| 4,716,864 | 1/1988 | Binder | 123/90.27 |

FOREIGN PATENT DOCUMENTS

| | | | |
|---|---|---|---|
| 0210110 | 12/1982 | Japan | 123/90.31 |
| 0015612 | 1/1984 | Japan | 123/90.27 |
| 0012808 | 1/1988 | Japan | 123/90.31 |

Primary Examiner—David A. Okonsky
Assistant Examiner—Weilun Lo
Attorney, Agent, or Firm—Ernest A. Beutler

[57] ABSTRACT

A camshaft drive arrangement for a V type engine having a pair of flexible transmitters that drive intermediate shafts which, in turn, drive respective camshafts associated with the respective cylinder banks. A combined flexible transmitter and guide member is disposed between the flexible transmitters that drive the intermediate shafts for tensioning one of these flexible transmitters and acting as a guide for the other of them.

8 Claims, 4 Drawing Sheets

V TYPE ENGINE

BACKGROUND OF THE INVENTION

This invention relates to a V type engine and more particularly to an improved camshaft drive arrangement for a V type engine.

There are many advantages to the use of engines having their cylinders arranged in banks that are disposed at angular relationship to each other to provide a V shaped configuration for the engine. Normally, such constructions permit an overall shortening of the length of the engine for a given number of cylinders and to provide an otherwise more compact assembly. However, the compact assemblage of such V type engines give rise to certain problems in connection with their construction and design. Specifically, because of the compact arrangement the drive of the camshafts for such an engine can present some problems, particularly if one or more overhead camshafts are employed for the engine.

As is well known, it is necessary for four cycle engines to drive the camshafts at one half the speed of the engine output shaft so as to afford the proper timing relationship. However, when such a two to one ratio is achieved in a single pass, then the size of the individual sprockets on the camshafts can become quite large and can make placement a problem. In order to overcome these difficulties, it has been proposed to provide the reduction ratio in two passes between the crankshaft and the camshaft. In addition to this reason, there are other reasons why it may be desirable to drive the camshafts rather than directly from the engine crankshaft from an intermediate shaft that is disposed between the camshafts and the crankshaft. Of course, if such intermediate shaft drives are employed, this can further complicate the drive mechanism in the area of the engine where the camshafts are driven.

It is also desirable to employ flexible transmitters such as chains for driving the camshafts and the intermediate shafts. However, with flexible transmitters, if not essential, it is at least desirable to insure a tensioning mechanism for the transmitter and also some form of guide that will insure that the transmitter cannot become displaced from the driving and driven sprockets. Of course, when such an arrangement is employed with a V type engine, this can present considerable problems due to the compact construction in the area where the transmitters lie.

It is, therefore, a principal object of this invention to provide an improved arrangement for driving the flexible transmitters of a V type engine for a camshaft drive and for tensioning and guiding these transmitters.

It is a further object of this invention to provide an improved, compact tensioner and guide arrangement that can be positioned in the area between the cylinder banks for operating with the flexible transmitters in this area.

SUMMARY OF THE INVENTION

This invention is adapted to be embodied in a camshaft drive arrangement for a V type engine having a pair of angularly disposed cylinder banks. First and second camshafts are journaled for rotation respectively at the upper ends of the first and second cylinder banks. An output shaft is driven by the engine and is rotatable about an axis that is parallel to the axis of rotations of the camshafts. A first flexible transmitter drives the first camshaft from the engine output shaft and a second flexible transmitter drives the second camshaft from the engine output shaft. A combined flexible transmitter tensioner and guide mechanism is positioned in part between the first and second flexible transmitters for tensioning the return side of one of the flexible transmitters and for guiding the driving side of the other of the flexible transmitters and for reducing its degree of permissible axial motion so as to maintain it in contact with one of the sprockets that is associated with it.

DETAILED DESCRIPTION OF THE PREFERRED EMBODIMENT OF THE INVENTION

Figure 1:
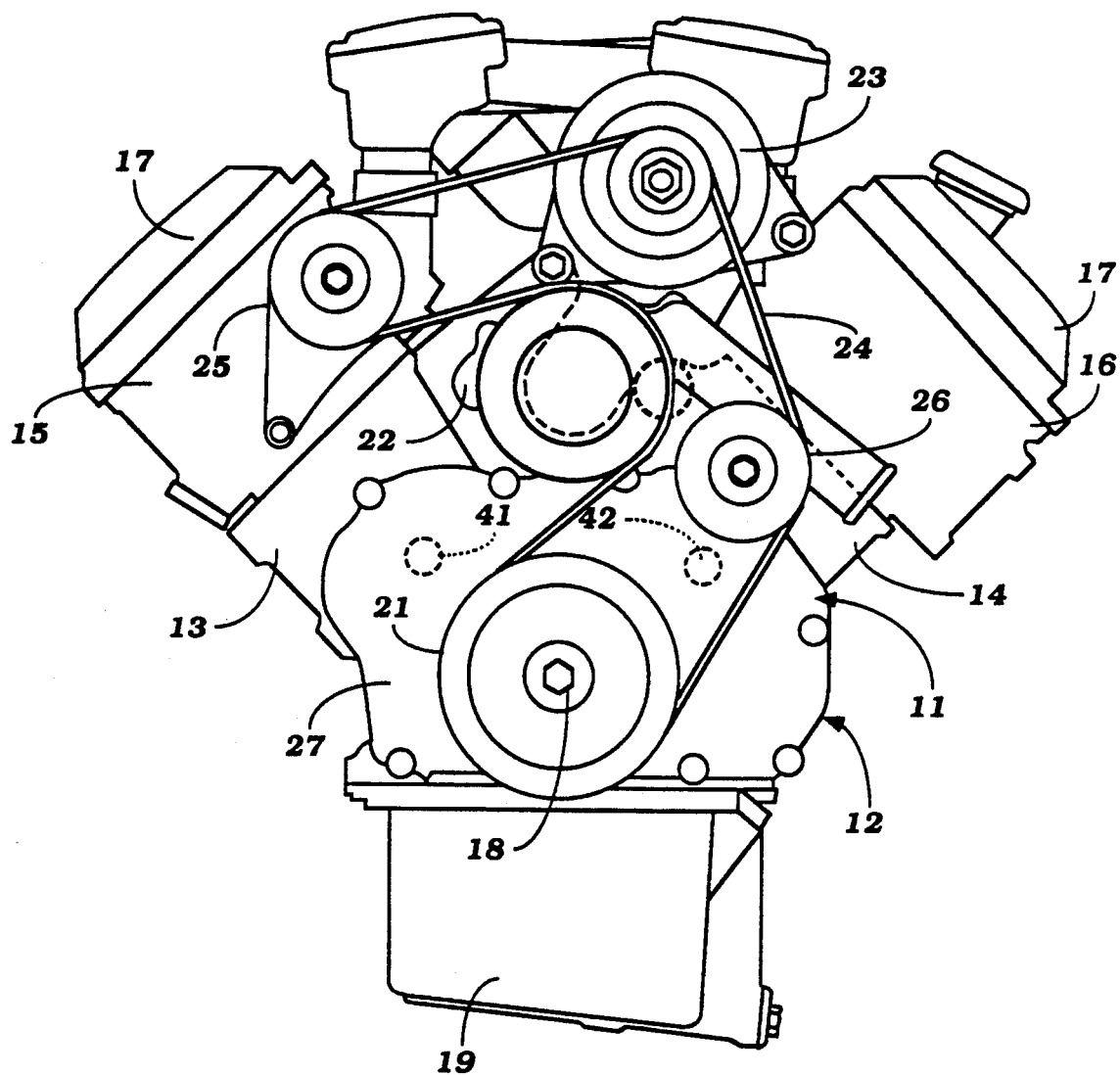
FIG. 1 is a front elevational view of an internal combustion engine constructed in accordance with an embodiment of the invention.

Referring now in detail to the drawings and initially, primarily to FIG. 1, a V type internal combustion engine having a camshaft drive arrangement constructed in accordance with an embodiment of this invention is identified generally by the reference numeral 11. In the depicted embodiment, the engine 11 is of the V-8 type; it should, however, be readily apparent to those skilled in the art how the invention can be utilized in conjunction with engines having other cylinder numbers and other cylinder configurations.

The engine 11 is provided with a cylinder block, indicated generally by the reference numeral 12 that defines a pair of angularly disposed cylinder banks 13 and 14. These cylinder banks are disposed at a V angle to each other and define a valley between them. Cylinder heads 15 and 16 are affixed to the cylinder banks 13 and 14 respectively. Cam cover assemblies 17 are affixed to each of the cylinder heads and contain the cam drive operating mechanism.

Since the internal construction of the engine forms no part of the invention, it has not been described in detail, except insofar as is necessary to understand the construction and operation of the camshaft drive. However, it should be noted that there are provided pistons in the respective cylinder banks. These are connected by means of connecting rods to drive a crankshaft 18 that is journaled for rotation in a known manner between the cylinder block 12 and a crankcase assembly 19 that is affixed to the lower end of the cylinder block 12.

A plurality of accessories are driven at the front of the engine from a pulley 21 that is affixed to the crankshaft 19. These accessories include a water pump 22 and generator 23. A timing belt 24 drives these accessories and tensioner idler assemblies 25 and 26 cooperate with this drive belt 24 to direct its path and to tension it.

In accordance with the invention, the engine 11 includes an overhead valve mechanism that includes a pair of overhead mounted camshafts journaled in each of the cylinder heads 15 and 16 and which is driven in part by a flexible transmitter drive assembly that is contained within a timing case 27 formed at the front of the engine and specifically at the front of the cylinder block 12. This timing and drive mechanism will now be described by particular reference to the remaining figures.

Figure 2:
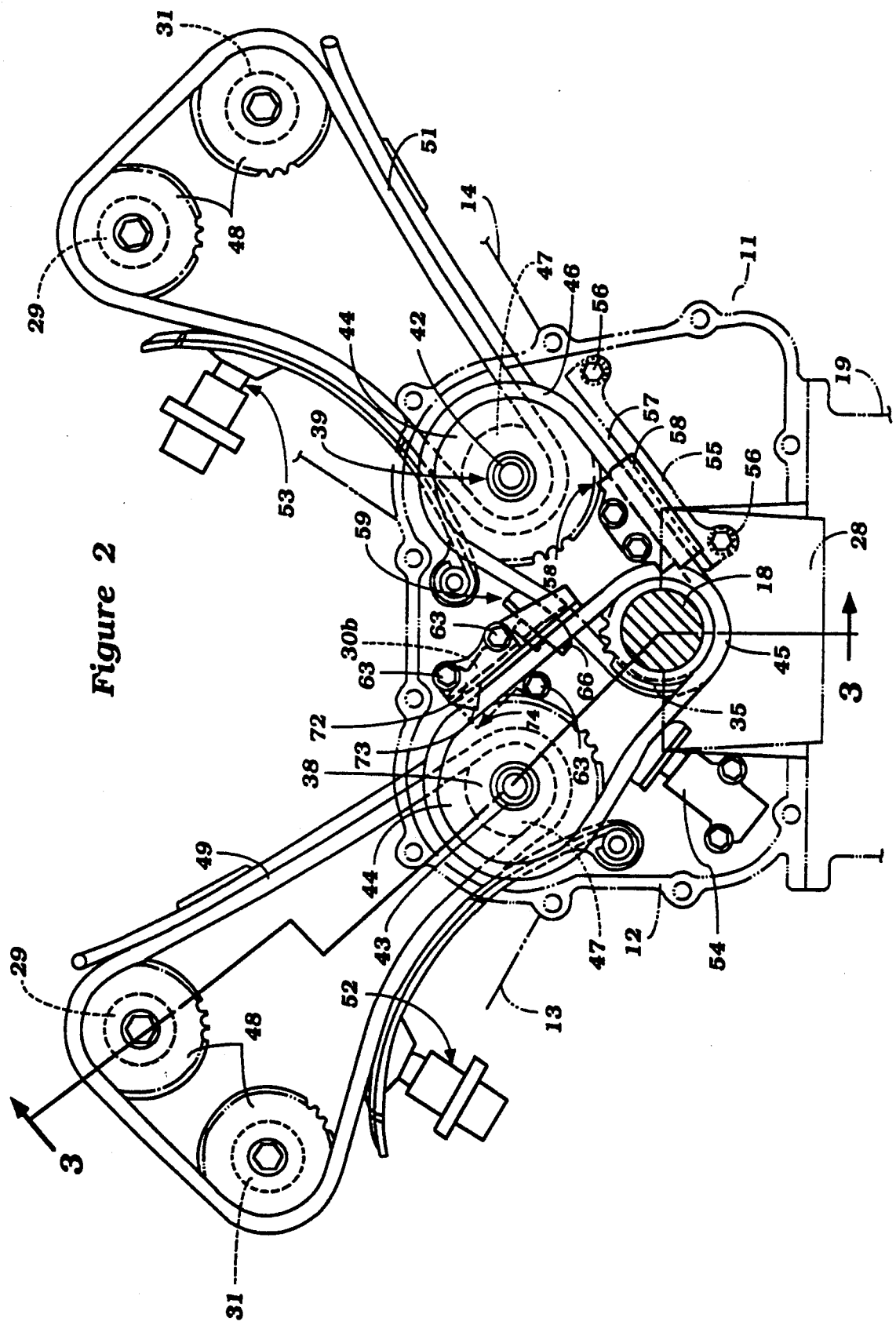
FIG. 2 is an enlarged front elevational view, with certain of the components removed so as to more clearly show the camshaft drive arrangement and with other portions shown in phantom.
Figure 3:
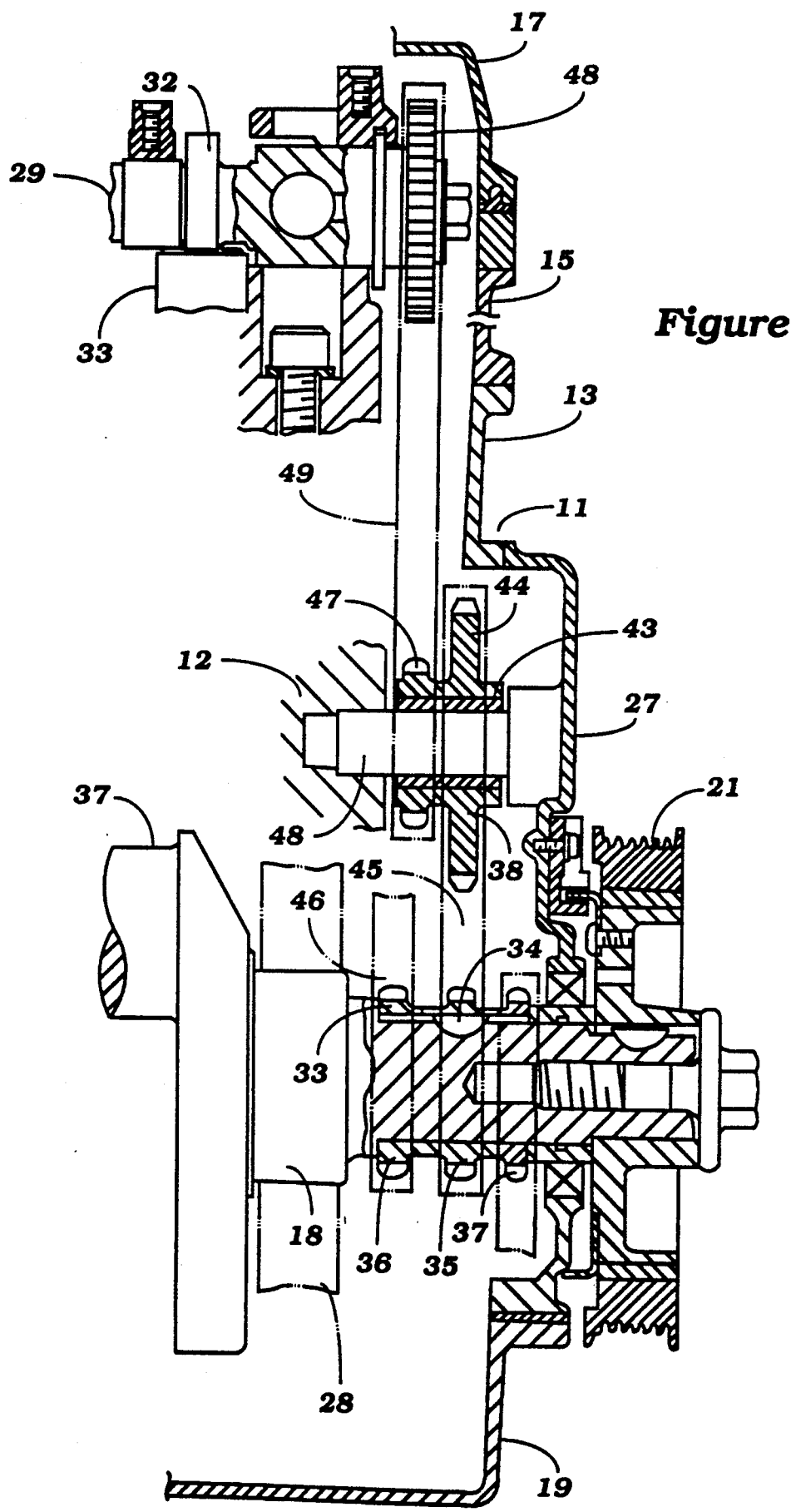
FIG. 3 is a cross sectional view taken generally along the line 3—3 of FIG. 2.

As may be seen in FIGS. 2 and 3, the rotatable support for the crankshaft 18 includes a plurality of bearing caps 28 that are affixed to the cylinder block and which journal the crankshaft 18. As also may be seen in this figure, there are provided on each of the cylinder heads 15 and 16, as aforenoted, a respective intake camshaft 29 and an exhaust camshaft 31, which camshafts operate the valves associated with the respective cylinders of the banks in a known manner. For example, as shown in FIG. 2, the intake camshaft 29 has a plurality of lobes 32 that cooperate with thimble tappets 33 so as to operate the valves which are not shown since, as aforenoted, they may be considered to be conventional.

The camshaft drive mechanism, which forms the subject of this invention, includes a compound sprocket assembly, indicated generally by the reference numeral 34 which is affixed for rotation at the forward end of the camshaft 18 by means of a key 34 and retaining mechanism. The drive sprocket 33 has a pair of axially disposed sprockets 35 and 36 that are formed axially thereupon. As is well known in V type engine practice, the cylinder banks of the cylinder blocks 13 and 14 are offset axially relative to each other so that a pair of adjacent connecting rods of the cylinder blocks can be journaled on a common throw, such as the throw 37, of the crankshaft 18. If desired, the sprocket assembly 33 may also contain a further sprocket 37 which is designed so as to operate an internal accessory, such as an oil pump (not shown).

In accordance with the camshaft drive construction of the invention, the camshafts 29 and 31 are not driven directly from their respective sprockets 35 and 36. They are rather driven from respective compound sprocket assemblies 38 and 39 that are journaled respectively on intermediate shafts 41 and 42 that are affixed to the front of the respective cylinder banks 13 and 14. These sprocket assemblies 38 and 39 are journaled by respective bushings 43 and have first sprockets 44 formed thereon that are driven from the sprockets 35 and 36 of the crankshaft by respective transmitters such as chains 45 or 46. Alternatively, belts may be employed but since this first drive mechanism is disposed within the crankcase area of the engine, the use of chains may be preferred.

As should be readily apparent, the angle between the cylinder banks results in the flexible transmitters 45 and 46 also being disposed at an angle to each other, as is clearly shown in FIG. 2.

Each of the sprocket assemblies 38 and 39 includes a second sprocket portion 47 that drives a pair of sprockets 48 affixed to the front ends of the camshafts 29 and 31 of the respective cylinder bank by means of a flexible transmitter 49 and 51. The flexible transmitters 49 and 51 are, in the illustrated embodiment, also chains although the invention can be equally as well practiced, as should be readily apparent to those skilled in the art, through the use of belts.

As has been previously noted, a portion of the two to one speed reduction between the crankshaft 18 and the camshafts 29 and 31 is accomplished in the first drive utilizing the chains 45 and 46 with the remaining portion being achieved in the drive using the chains 49 and 51. Of course, the invention can be utilized in conjunction with an arrangement wherein the speed reduction is achieved in one of the drives and the other drive is at a unitary relationship. However, the invention has greater utility in conjunction with arrangements wherein the speed reduction is achieved in two steps because this permits the use of smaller sprocket assemblies in a more compact construction, which is a principal object of the invention.

There are provided a pair of respective chain tensioner assemblies 52 and 53, which may be of any known type and which are disposed so as to act upon the return or non drive sides of the flexible transmitters or chains 49 and 51. In addition, guide plates may be positioned adjacent the drive sides of these chains or belts to maintain them in alignment and so as to insure that they will not become displaced from the sprockets 48.

The drive chain 45 of the first drive assembly associated with the intermediate shaft and its sprocket assembly 38 is provided with a tensioner 54 that acts on its return side. The tensioner 54 may be of the spring bias type, the hydraulic bias type or any combination thereof. This mechanism serves to preserve adequate tension in the drive chain 45.

On the drive side of the chain 46, there is provided a guide assembly, indicated generally by the reference numeral 55 that is secured to the front of the cylinder block 12 by means of threaded fasteners 56. This guide assembly 55 has a wear plate 57 that is engaged with the drive side of the chain 46 so as to insure that it will be held in place and cannot easily leave its driving engagement with the sprockets 36 or 44. There is further provided an index plate 58 that is affixed to the cylinder block and which has a pair of pointers that line up with markers on the sprocket assembly 33 (not shown) and a marker on the sprocket 39, indicated at 58, to signify when there is the correct timing relationship between the crankshaft 18 and the sprocket 39.

Figure 4:
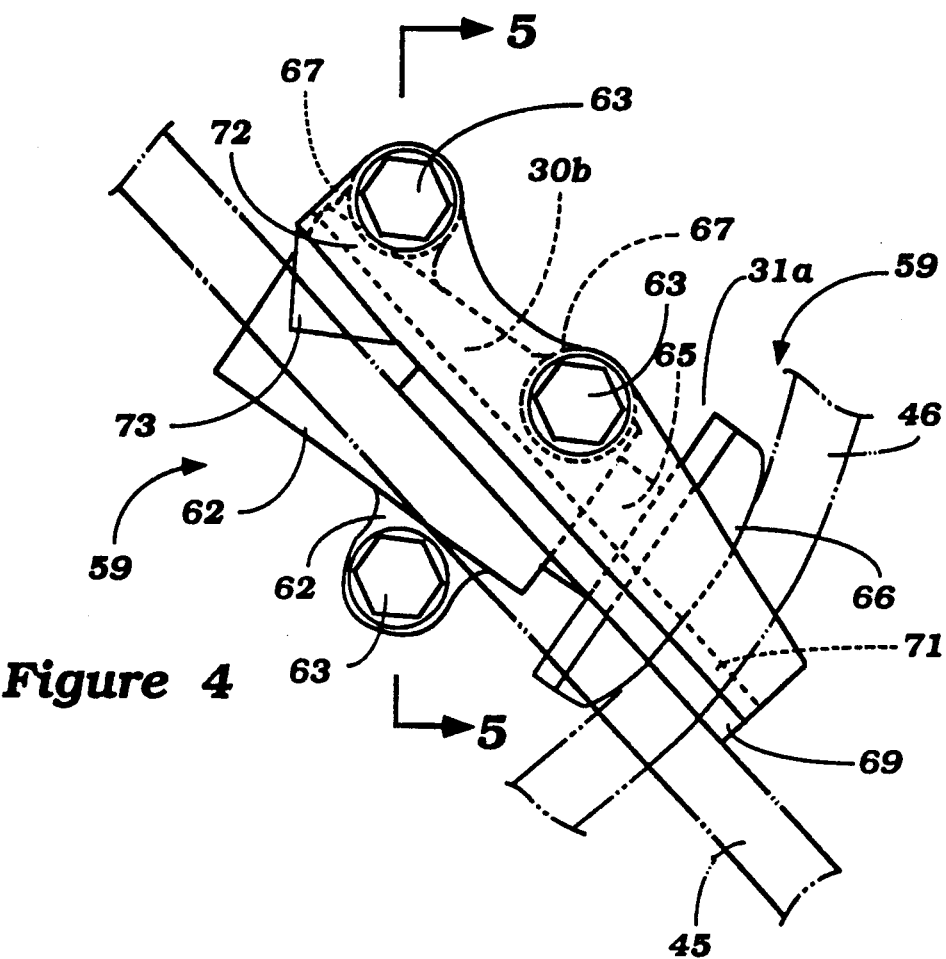
FIG. 4 is an enlarged front elevational view of the combined tensioner and camshaft guide arrangement.
Figure 5:
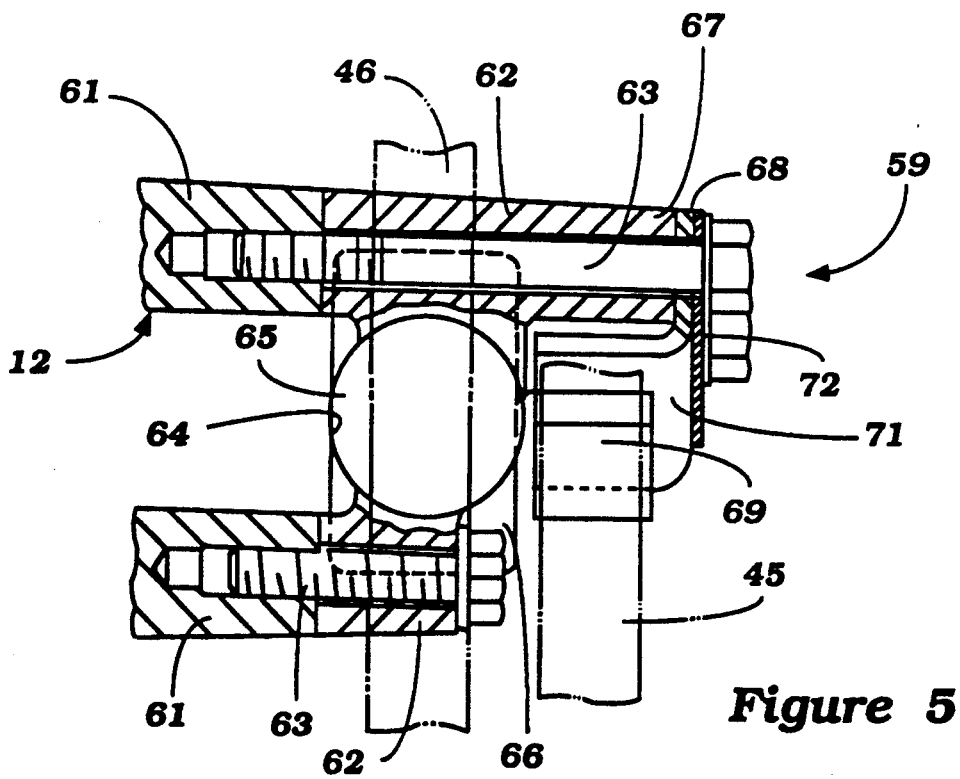
FIG. 5 is a cross sectional view taken along the line 5—5 of FIG. 4.

It should be readily apparent that the area in the bank between the drive side of the chain 45 and the return side of the chain 46 there is very little space and it is necessary, obviously, to provide both a tensioner for the chain 46 and a guide for the chain 45 in this area. This is accomplished by means of a combined assembly consisting of a tensioner and guide and indicated generally by the reference numeral 59. This combined assembly 59 has a construction that may be best understood by reference to FIGS. 4 and 5.

As may be seen herein, the cylinder block 12 is provided with a pair of forwardly extending bosses 61 to which a housing assembly 62 of the combined guide and tensioner 59 is affixed by means of threaded fasteners 63. The body assembly 62 is formed with a bore 64 in which a piston rod or cylindrical guide post 65 of a tensioner is slidably supported. The tensioner guide or post 65 is provided with a shoe on which a wear resistant material 66 is formed which is engaged with the return side of the chain 46 for its tensioning. The post 65 may be urged outwardly in any direction and is suitably clamped in place.

In addition, the housing 62 has a pair of outwardly extending cylindrical bosses 67 through which a pair of fasteners 63 which are elongated extend. These elongated fasteners also affix a guide plate 68 having a guide surface or guide member 69 of a wear resistant material affixed to it. To this end, the plate 68 is formed with a reversely bent portion 71 to which the guide member 69 is affixed. This guide member 69 then engages the drive side of the chain 45 so as to keep it in contact with the sprocket 35 and the sprocket portion 44 of the sprocket assembly 38. Therefore, it should be readily apparent that this construction provides an extremely compact and yet highly effective assembly. In addition, there is provided an index plate 72 that is affixed to the assemblage 59 by the elongated fasteners 63 and which has a marker portion 73 that cooperates with an index mark 74 on the sprocket assembly 38 so as to set the timing of the camshaft assembly of this bank in a known manner.

It should be readily apparent from the foregoing description that the described construction provides a very compact and yet effective mechanism for tensioning one drive chain while maintaining the other drive chain in engagement with its respective sprockets. Of course, this description is only that of a preferred embodiment of the invention. Various changes and modifications may be made without departing from the spirit and scope of the invention, as defined by the appended claims.

We claim:

1. A camshaft drive arrangement for a V type internal combustion engine having a pair of angularly disposed cylinder banks, an output shaft, a plane bisecting said cylinder banks and including said output shaft, a first camshaft adjacent said plane rotatably journaled at an upper end of a first of said cylinder banks, a second camshaft adjacent said plane rotatably journaled at an upper end of the second of said cylinder banks, said output shaft being driven by said engine and rotatable about an axis parallel to said camshafts, first flexible transmitter means for driving said first camshaft from said engine output shaft, second flexible transmitter means for driving said second camshaft from said output shaft, said first and said second flexible transmitter means defining a generally V configuration corresponding to the angle between said cylinder banks, and a combined flexible transmitter tensioner and guide member assembly positioned in an area between said first and said second flexible transmitter means and solely supported closer to said output shaft than said cam shafts for tensioning one of said flexible transmitter means and for guiding the movement of the other of said flexible transmitter means.

2. A camshaft drive arrangement as set forth in claim 1 wherein the tensioning means acts upon the return side of the first flexible transmitter means and wherein the guide means acts upon the drive side of the second flexible transmitter means and wherein the tension means comprises a housing supporting a biased plunger that engages said return side of said first flexible transmitter, and said guide means is fixed relative to said housing.

3. A camshaft drive arrangement as set forth in claim 2 wherein the first and second flexible transmitter means are driven by a pair of axially spaced sprockets, respectively connected to one end of the engine output shaft for rotation therewith.

4. A camshaft drive arrangement as set forth in claim 1 wherein the for a V type internal combustion engine having a pair of angularly disposed cylinder banks, a first camshaft rotatably journaled at an upper end of a first of said cylinder banks, a second camshaft rotatable journaled at an upper end of the second of said cylinder banks, an output shaft drive by said engine and rotatable about an axis parallel to said camshafts, first flexible transmitter means for driving said first camshaft from said engine output shaft, second flexible transmitter means for driving said second camshaft from said output shaft, said first and said second flexible transmitter means defining a generally V configuration corresponding to the angle between said cylinder banks, and a combined flexible transmitter tensioner and guide member positioned in an area between said first and said flexible transmitter means for tensioning one of said flexible transmitter means and for guiding the movement of the other of said flexible transmitter means, said first flexible transmitter means comprising a first flexible transmitter driving a first intermediate shaft from said engine output shaft and a second flexible transmitter driving said first camshaft from said first intermediate shaft, said second flexible transmitter means comprises a third flexible transmitter driving a second intermediate shaft from said engine output shaft and a fourth flexible transmitter driving said second camshaft from said second intermediate shaft, the combined flexible transmitter tension and the guide member acting upon the first and third flexible transmitters.

5. A camshaft drive arrangement as set forth in claim 4 wherein the tensioning means acts upon the return side of the first flexible transmitter and wherein the guide means acts upon the drive side of the third flexible transmitter.

6. A camshaft drive arrangement as set forth in claim 5 wherein the first and third flexible transmitters are driven by a pair of axially spaced sprockets connected to one end of the engine output shaft for rotation therewith.

7. A camshaft drive arrangement as set forth in claim 6 further including third and fourth camshafts rotatably journaled at the respective ends of the first and second cylinder banks, the second flexible transmitter driving the third camshaft as well as the first camshaft from the first intermediate shaft and the fourth flexible transmitter driving the second and fourth camshafts.

8. A camshaft arrangement as set forth in claim 2 wherein common fastening means fix the guide means to the housing and the housing relative to the crankshaft.

* * * * *